(12) United States Patent
Kowalevicz et al.

(10) Patent No.: US 11,595,129 B2
(45) Date of Patent: Feb. 28, 2023

(54) METHOD FOR FULLY-NETWORKABLE SINGLE APERTURE FREE-SPACE OPTICAL TRANSCEIVER

(71) Applicant: RAYTHEON COMPANY, Waltham, MA (US)

(72) Inventors: Andrew Kowalevicz, Arlington, VA (US); Gary M. Graceffo, Burke, VA (US); Benjamin P. Dolgin, Alexandria, VA (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 17/112,703

(22) Filed: Dec. 4, 2020

(65) Prior Publication Data
US 2022/0182147 A1     Jun. 9, 2022

(51) Int. Cl.
| | |
|---|---|
| *H04B 10/00* | (2013.01) |
| *H04B 10/40* | (2013.01) |
| *H04B 10/532* | (2013.01) |

(52) U.S. Cl.
CPC ........... *H04B 10/40* (2013.01); *H04B 10/532* (2013.01)

(58) Field of Classification Search
CPC .............. H04B 10/616; H04B 10/5561; H04B 2210/516; G02B 6/2746; G02B 6/272; G02B 6/2773; G02B 6/4213; G02B 6/4246; G02B 6/4208; G02B 6/4214; G02B 6/4215; G02F 1/093
See application file for complete search history.

(56) References Cited

U.S. PATENT DOCUMENTS

| | | | | |
|---|---|---|---|---|
| 5,912,748 A | * | 6/1999 | Wu ................... | G02B 6/29302 359/251 |
| 6,882,764 B1 | * | 4/2005 | Deng .................. | H01S 3/063 359/333 |
| 7,039,278 B1 | * | 5/2006 | Huang ................ | G02F 1/093 385/11 |
| 7,361,884 B2 | * | 4/2008 | Tanaka ............... | G02F 1/093 385/11 |
| 9,018,575 B2 | | 4/2015 | Kowalevicz et al. | |
| 9,165,963 B2 | | 10/2015 | Kowalevicz et al. | |
| 9,171,219 B2 | | 10/2015 | Kowalevicz | |
| 9,323,034 B2 | | 4/2016 | Dolgin | |

(Continued)

OTHER PUBLICATIONS

International Search Report and Written Opinion in International Patent Application No. PCT/US2021/058064 dated Dec. 7, 2021.

*Primary Examiner* — David C Payne
*Assistant Examiner* — Pranesh K Barua
(74) *Attorney, Agent, or Firm* — Lando & Anastasi, LLP

(57) ABSTRACT

Monostatic optical transceivers, systems, and methods of operating the same include a single aperture, a transmitter that provides a modulated and polarized optical transmit beam, a receiver that receives a modulated and polarized optical receive beam at an optical resonator included therein and processes the received optical receive beam to determine information from the received optical receive beam, a polarizing beam splitter that reflects the optical transmit beam, a polarization rotator that rotates the polarization of the reflected optical transmit beam by a fixed number of degrees in a transmit direction in a coordinate system of the monostatic transceiver, and a waveplate that modifies the polarization of the rotated optical transmit beam.

24 Claims, 6 Drawing Sheets

(56) References Cited

U.S. PATENT DOCUMENTS

| | | |
|---|---|---|
| 9,400,414 B2 | 7/2016 | Kowalevicz |
| 9,451,185 B2 | 9/2016 | Dolgin et al. |
| 9,503,660 B2 | 11/2016 | Kowalevicz et al. |
| 9,535,245 B1 | 1/2017 | Kowalevicz |
| 9,538,096 B2 | 1/2017 | Dolgin |
| 9,887,779 B2 | 2/2018 | Kowalevicz |
| 9,973,281 B2 | 5/2018 | Kowalevicz et al. |
| 9,989,700 B1 * | 6/2018 | Ayliffe ............... G02B 6/4246 |
| 10,164,765 B2 | 12/2018 | Dolgin et al. |
| 10,177,856 B2 | 1/2019 | Kowalevicz et al. |
| 10,205,526 B2 | 2/2019 | Kowalevicz |
| 10,225,020 B2 | 3/2019 | Dolgin et al. |
| 10,243,670 B2 | 3/2019 | Kowalevicz et al. |
| 10,243,673 B2 | 3/2019 | Dolgin et al. |
| 10,250,292 B2 | 4/2019 | Graceffo et al. |
| 10,256,917 B2 | 4/2019 | Dolgin et al. |
| 10,305,602 B2 | 5/2019 | Dolgin et al. |
| 10,313,022 B2 | 6/2019 | Dolgin et al. |
| 10,340,965 B2 | 7/2019 | Dolgin et al. |
| 10,374,743 B2 | 8/2019 | Dolgin et al. |
| 10,378,880 B2 | 8/2019 | Dolgin et al. |
| 10,498,464 B2 | 12/2019 | Graceffo et al. |
| 10,530,494 B2 | 1/2020 | Dolgin et al. |
| 10,554,306 B1 | 2/2020 | Graceffo et al. |
| 10,571,774 B2 | 2/2020 | Graceffo et al. |
| 10,637,580 B2 | 4/2020 | Dolgin et al. |
| 10,686,533 B2 | 6/2020 | Dolgin et al. |
| 10,714,251 B2 | 7/2020 | Dolgin et al. |
| 10,826,603 B1 | 11/2020 | Kowalevicz et al. |
| 10,924,189 B2 | 2/2021 | Kowalevicz et al. |
| 11,012,160 B2 | 5/2021 | Kowalevicz et al. |
| 11,101,896 B2 | 8/2021 | Kowalevicz et al. |
| 11,133,873 B1 | 9/2021 | Kowalevicz et al. |
| 11,159,244 B2 | 10/2021 | Graceffo et al. |
| 11,159,245 B2 | 10/2021 | Kowalevicz et al. |
| 11,258,516 B2 | 2/2022 | Graceffo et al. |
| 11,290,191 B2 | 3/2022 | Graceffo et al. |
| 11,303,356 B1 | 4/2022 | Kowalevicz et al. |
| 11,307,395 B2 | 4/2022 | Kowalevicz et al. |
| 11,309,964 B1 | 4/2022 | Kowalevicz et al. |
| 2006/0140548 A1 * | 6/2006 | Shin ............... G02B 6/4246 385/89 |
| 2006/0262396 A1 * | 11/2006 | Smith ............... G02B 6/4246 359/489.08 |
| 2016/0047987 A1 * | 2/2016 | Du ............... G02B 6/2773 359/484.05 |
| 2017/0269005 A1 * | 9/2017 | Sawabe ............... G01N 21/21 |
| 2019/0158208 A1 * | 5/2019 | Dolgin ............... H04B 10/677 |
| 2020/0136727 A1 | 4/2020 | Graceffo et al. |
| 2020/0409189 A1 | 12/2020 | Graceffo et al. |
| 2021/0021351 A1 | 1/2021 | Kowalevicz et al. |
| 2021/0021449 A1 | 1/2021 | Graceffo et al. |
| 2021/0041515 A1 | 2/2021 | Dolgin |
| 2021/0099234 A1 | 4/2021 | Graceffo et al. |
| 2021/0126715 A1 | 4/2021 | Graceffo et al. |
| 2021/0314071 A1 | 10/2021 | Graceffo et al. |
| 2022/0014276 A1 | 1/2022 | Kowalevicz et al. |

* cited by examiner

METHOD FOR FULLY-NETWORKABLE SINGLE APERTURE FREE-SPACE OPTICAL TRANSCEIVER

BACKGROUND

Light waves may be made to carry information by modulating a light source, often a laser source, to change various properties of the light, such as its amplitude, phase, frequency, wavelength, etc. The light waves may be in the visible spectral band, the infrared spectral band, or another region of the electromagnetic spectrum.

Free-space optical communication (FSO) is a line-of-sight optical communication technology that uses lasers to propagate light in free space to wirelessly transmit optical signals carrying data for telecommunications. FSO transceivers require transmit and receive apertures to send and receive information respectively. In general, conventional approaches separate the two apertures (i.e., a bistatic transceiver), thus increasing size and complexity of the overall optical transceiver.

SUMMARY

Aspects and embodiments are directed to a monostatic optical transceiver comprising a single aperture, a transmitter configured to provide a modulated and polarized optical transmit beam, a receiver configured to receive a modulated and polarized optical receive beam at an optical resonator included therein, and process the received optical receive beam to determine information from the received optical receive beam, a polarizing beam splitter configured to reflect the optical transmit beam, a polarization rotator configured to rotate the polarization of the reflected optical transmit beam by a fixed number of degrees in a transmit direction in a coordinate system of the monostatic optical transceiver, and a waveplate configured to modify the polarization of the rotated optical transmit beam, the single aperture being optically coupled to the transmitter, the receiver, the polarizing beam splitter, the polarization rotator, and the waveplate.

In one example, the optical resonator is a Fabry Perot etalon.

In another example, the polarization rotator is a Faraday rotator.

In one example, the receiver further comprises a beam splitter configured to provide the modulated and polarized optical receive beam to one or more of at least one detector and the optical resonator.

In another example, the monostatic optical transceiver further comprises a detector, the waveplate is further configured to receive a modulated input beam and rotate a polarization of the received input beam, the polarization rotator is further configured to receive the rotated input beam from the waveplate and further rotate the polarization of the rotated input beam, the polarizing beam splitter is further configured to receive the further rotated input beam from the polarization rotator, the further rotated input beam being the modulated and polarized optical receive beam, and the optical resonator is configured to receive and accumulate energy of the modulated and polarized optical receive beam, the detector being configured to produce an intensity-modulated output signal from the accumulated energy.

In one example, the monostatic optical transceiver further comprises an optical bandpass filter coupled between the optical resonator and the polarizing beam splitter, the optical bandpass filter configured to filter the modulated and polarized optical receive beam.

In another example, one of the optical transmit beam and the received optical receive beam is P-polarized and the other of the optical transmit beam and the received optical receive beam is S-polarized.

In one example, the waveplate is a half-wave plate configured to rotate the polarization-rotated optical transmit beam from the fixed number of degrees along the transmit direction to be perpendicular to a reference direction in a universal coordinate system.

In another example, the waveplate is a quarter-wave plate configured to convert the polarization-rotated optical transmit beam from the fixed number of degrees along the transmit direction to being circularly polarized in the transmit direction.

Aspects and embodiments are directed to a monostatic optical transceiver system including the monostatic optical transceiver, the monostatic optical transceiver system comprising a second monostatic optical transceiver including a second single aperture, and a half-wave plate configured to receive the modified rotated optical transmit beam from the waveplate of the monostatic optical transceiver through the second single aperture and alter the polarization of the modified rotated optical transmit beam, and a second polarization rotator configured to rotate the polarization of the altered optical transmit beam in the coordinate system of the monostatic optical transceiver by the fixed number of degrees, or a quarter-wave plate configured to receive the modified rotated optical transmit beam from the waveplate of the monostatic optical transceiver through the second single aperture, the modified rotated optical transmit beam being circularly polarized by the waveplate of the monostatic optical transceiver, and alter the circularly polarized beam to be linearly-polarized to the negative of the fixed number of degrees in the coordinate system of the monostatic optical transceiver, and a second polarization rotator configured to rotate the polarization of the linearly-polarized beam clockwise by the negative number of degrees in the coordinate system of the monostatic optical transceiver.

Aspects and embodiments are directed to a method of operating a monostatic optical transceiver comprising the acts of providing the monostatic optical transceiver including a transmitter, a receiver, a polarizing beam splitter, a polarization rotator, a waveplate, and a single aperture, the transmitter providing a modulated and polarized optical transmit beam, the receiver receiving a modulated and polarized optical receive beam at an optical resonator included therein, and processing the received optical receive beam to determine information from the received optical receive beam, the polarizing beam splitter reflecting the optical transmit beam, the polarization rotator rotating the polarization of the reflected optical transmit beam by a fixed number of degrees in a transmit direction in a coordinate system of the monostatic optical transceiver, and the waveplate modifying the polarization of the rotated optical transmit beam, the single aperture being optically coupled to the transmitter, the receiver, the polarizing beam splitter, the polarization rotator, and the waveplate.

In one example, the optical resonator is a Fabry Perot etalon that receives and accumulates energy of the modulated and polarized optical receive beam.

In another example, the polarization rotator is a Faraday rotator and the reflected optical transmit beam is S-polarized, the received optical receive beam is P-polarized, and the Faraday rotator rotates the S-polarized beam by a fixed number of degrees along the transmit direction in the coordinate system of the monostatic optical transceiver and rotates the modified optical transmit beam from the waveplate to be the P-polarized received optical receive beam, or the reflected optical transmit beam is P-polarized, the received optical receive beam is S-polarized, and the Faraday rotator rotates the P-polarized beam by a fixed number of degrees along the transmit direction of the monostatic optical transceiver and rotates the modified optical transmit beam from the waveplate to be the S-polarized received optical receive beam.

In one example, providing the monostatic optical transceiver further comprises providing a beam splitter, the beam splitter providing the modulated and polarized optical receive beam to one or more of at least one detector and the optical resonator.

In another example, providing the monostatic optical transceiver further comprises providing a detector, the waveplate receiving a modulated input beam and rotating a polarization of the received input beam, the polarization rotator receiving the rotated input beam from the waveplate and rotating the polarization of the rotated input beam, the polarizing beam splitter receiving the further rotated input beam from the polarization rotator, the further rotated input beam being the modulated and polarized optical receive beam, the optical resonator receiving and accumulate energy of the modulated and polarized optical receive beam, and the detector being configured to produce an intensity-modulated output signal from the accumulated energy.

In one example, providing the monostatic optical transceiver further comprises providing an optical bandpass filter optically coupled between the optical resonator and the polarizing beam splitter, the optical bandpass filter configured to filter the modulated and polarized optical receive beam.

In another example, one of the optical transmit beam and the received optical receive beam is P-polarized and the other of the optical transmit beam and the received optical receive beam is S-polarized.

In one example, the waveplate is a half-wave plate that rotates the polarization-rotated optical transmit beam from the fixed number of degrees along the transmit direction to be perpendicular to a reference direction in a universal coordinate system.

In another example, the waveplate is a quarter-wave plate that converts the polarization-rotated optical transmit beam from the fixed number of degrees along the transmit direction to being circularly polarized in the transmit direction.

Aspects and embodiments are directed to a method of operating a monostatic optical transceiver system including the monostatic optical transceiver comprising the acts of providing a second monostatic optical transceiver including a second single aperture, and a half-wave plate receiving the modified rotated optical transmit beam from the waveplate of the monostatic optical transceiver through the second single aperture and altering the polarization of the modified rotated optical transmit beam, and a second polarization rotator rotating the polarization of the altered optical transmit beam in the coordinate system of the monostatic transceiver by the fixed number of degrees, or a quarter-wave plate receiving the modified rotated optical transmit beam from the waveplate of the monostatic optical transceiver through the second single aperture, the modified rotated optical transmit beam being circularly polarized by the waveplate of the monostatic optical transceiver, and altering the circularly polarized beam to be linearly-polarized to the negative of the fixed number of degrees in the coordinate system of the monostatic transceiver, and a second polarization rotator rotating the polarization of the linearly polarized beam clockwise by the negative number of degrees in the coordinate system of the monostatic transceiver.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment. Various aspects and embodiments described herein may include means for performing any of the described methods or functions.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the disclosure. In the figures, each identical or nearly identical component that is illustrated in various figures is represented by a like numeral. For purposes of clarity, not every component may be labeled in every figure. In the figures.

DETAILED DESCRIPTION

Figure 1:
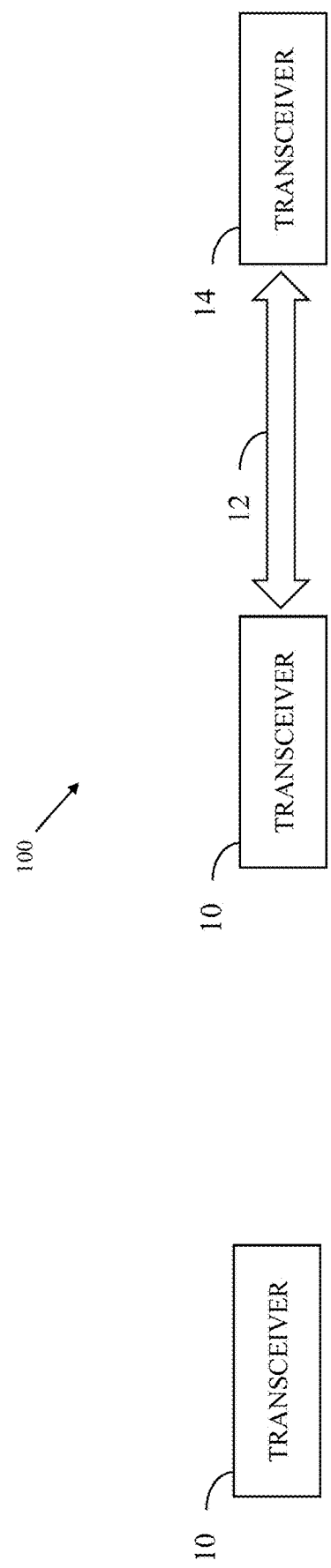
FIG. 1A is a block diagram of a transceiver according to various examples described herein.
FIG. 1B is a block diagram of a transceiver system according to various examples described herein.

It is to be appreciated that embodiments of the methods and apparatuses discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including,"

"comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

For the purposes of this disclosure, and as will be understood by those of skill in the art, the terms light, light signal, beam, light beam, and optical signal (including obvious variants thereof) may be used interchangeably herein and refer generally to an electromagnetic signal that propagates through a given medium, which may be empty space, e.g., a vacuum, or may be an atmospheric, e.g., air, or other medium, such as fiber or other optics components. The terms light, light signal, beam, light beam, and optical signal are not meant to imply any particular characteristic of the light, such as frequency or wavelength, band, coherency, spectral density, quality factor, etc., and may include radio waves, microwaves, infrared, visible, and/or ultraviolet electromagnetic radiation, or other electromagnetic radiation conventionally processed in the field of optics.

A problem that exists regarding previous transceiver designs is that they require one or more of a pre-existing knowledge of the wavelength, data rate, modulation format, or angular orientation of the incoming optical signal. Conventional bi-static systems attempting to address this problem are larger and more complex due to the use of separate optics for the transmitter and the receiver. Embodiments of monostatic transceivers described herein not only solve this problem, but are smaller and less complex than conventional bi-static systems.

To construct a fully networkable (i.e., compatible with any other transceiver within the operating band), single-aperture, FSO transceiver, according to some embodiments, several design considerations are taken into account. Both the transmit and receive ports are combined to operate without interfering with each other. Different transmit and/or receive wavelengths should be usable without changing the architecture of the transceiver. The transmit and receive beams are made separable by a polarizing beam splitter. By designing a monostatic FSO transceiver with these considerations in mind, such an FSO transceiver can interface to any transceiver operating at the same or different wavelength of light within the operating band of the FSO transceiver, without needing preexisting knowledge of the bandwidth. Furthermore, such an FSO transceiver does not require pairing with another transceiver before communicating or needing to operate on different transmit and receiver wavelengths.

FIG. 1A shows one embodiment of a monostatic transceiver 10. The transceiver 10 also includes a single aperture used by both a receiver and a transmitter therein. To simultaneously transmit and receive an optical signal through the single aperture, a plurality of internal optical elements within the transceiver 10 is arranged to ensure that the optical signal that is transmitted is 90 degrees rotated from the optical signal that is received by another transceiver. As described herein, there are generally two approaches to the design of the transceiver 10, both approaches having the same functionality of being fully networkable and having the above-described benefits. While two approaches are generally described, one of ordinary skill in the art would readily recognize additional embodiments of monostatic transceivers are achieved through modifications of the two approaches.

FIG. 1B shows a monostatic transceiver system generally indicated at 100. The monostatic transceiver system 100 includes the monostatic transceiver 10 from FIG. 1A in communication over a bi-direction communication channel 12 with a second monostatic transceiver 14. According to certain examples, the transceiver 10 and the second transceiver 14 are identical, having the same optical elements therein in the same arrangement.

Figure 2:
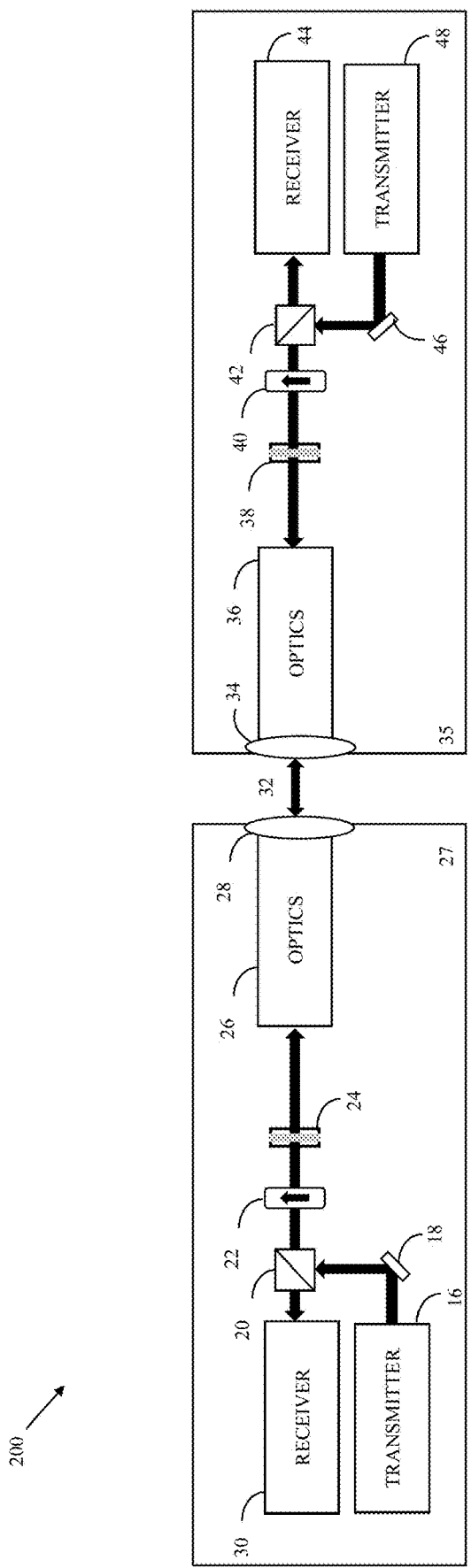
FIG. 2 is a block diagram of a transceiver system according to various examples described herein.

FIG. 2 shows a monostatic transceiver system generally indicated at 500 (e.g., similar to the system 100). The transceiver system 500 includes a first transceiver 27 in optical communication through a bi-directional communication channel 32 with a second transceiver 35. The first transceiver 27 includes a transmitter 16, a mirror 18, a polarizing beam splitter 20, a polarization rotator 22, a waveplate 24, front-end optics 26, a single aperture 28, and a receiver 30. The second transceiver 35 includes a transmitter 48, a mirror 46, a polarizing beam splitter 42, a polarization rotator 40, a waveplate 38, front-end optics 36, a single aperture 28, and a receiver 30. The first transceiver 27 and the second transceiver 35, as shown in FIG. 2, are identical, meaning they are constructed from the same components. For the sake of brevity, discussion of one component in one transceiver is intended to apply to the corresponding component in another transceiver of the same design. For example, the waveplate 24 is configured to modify a light beam in the same manner as the waveplate 38 and the polarization rotator 22 is configured to rotate the polarization of light in the same manner as the polarization rotator 40.

According to certain aspects, a monostatic transceiver (e.g., the transceiver 27) is configured to communicate with a non-identical transceiver, provided that the non-identical transceiver is configured to transmit the same type of beam as the monostatic transceiver (e.g., S-polarized). The polarization rotators 22, 40 are non-reciprocal devices, meaning light rotated by a specified amount or number of degrees leaving one polarization rotator will be further rotated by the same amount or number of degrees when received by another of the polarization rotators. The front-end optics 26, 36, on the other hand, include reciprocal optical devices. In certain aspects, each of the front-end optics 26, 36 includes a waveplate. The waveplates are reciprocal devices because light rotated by a specified amount or number of degrees leaving one waveplate will be rotated by the opposite or negative of the same amount or number of degrees when received by another of the waveplates.

The transmitter 16 is configured to transmit a modulated optical transmit beam. The modulation is one of phase-modulation, frequency modulation, or amplitude modulation. The optical transmit beam is reflected off the mirror 18 and travels towards the polarizing beam splitter 20, which reflects the optical transmit beam towards the polarization rotator 22. In certain embodiments, the optical transmit beam is transmitted directly to the polarizing beam splitter 20 and the mirror 18 is not included. Inclusion of the mirror 18 may contribute to a smaller overall design of the transceiver 27. The polarization rotator 22 then rotates the polarization of the reflected optical transmit beam by a fixed number of degrees in a transmit direction in a coordinate system of the transceiver 27. The rotated optical transmit beam leaving the polarization rotator 22 along the transmit direction encounters the waveplate 24, which modifies the polarization of the rotated optical transmit beam. In certain embodiments, the front-end optics 26, 36 include one or more of a telescope, a rifle scope, beam steering optics, and a situational awareness camera for coarsely pointing the transceiver.

In one example of the transceiver system 200, the optical transmit beam is S-polarized, the polarization rotators 22, 24 are Faraday rotators, and the waveplates 24, 38 are half-wave plates. Further to this example, two agreed-upon coordinates are needed: (1) the orientation of each polarization rotator 22, 24 (e.g., West of North facing in FIG. 2), and (2) the orientation of the outgoing polarization (e.g., perpendicular to gravity). The polarization rotators 22, 24 are oriented in the same direction based on a previously agreed-upon universally known coordinate (e.g., gravity). As the optical transmit beam reaches the polarization rotator 22, the polarization of the optical transmit beam is changed from S-Polarized to being linearly polarized at −45 degrees when looking along the transmit direction. The waveplate 24 then rotates the linearly polarized light to be perpendicular to gravity when leaving a telescope in the front-end optics 26 through the aperture 28 and into free space. The linearly polarized and modulated optical beam travels through free space and is input into the aperture 34 of the second transceiver 35. The communication channel 32 is thus a bidirectional channel that is polarized along the agree-upon universal coordinate system. The waveplate 38 of the second transceiver 35 rotates the polarization of the modulated input beam. Since the waveplates 24, 38 are reciprocal devices, the incoming light will be rotated back to the polarization of the initial transmitted beam after passing through the respective waveplate, but in the rotated frame of the opposite transceiver. The rotated input beam then comes into contact with the polarization rotator 40, which is oriented in the same direction on both transceivers 27, 35. Being non-reciprocal, the polarization rotator 40 further rotates the polarization of the input beam an additional −45 degrees, resulting in a linearly polarized beam that is perpendicular to the transmitted beam in the second transceiver 35. As a result, the further rotated input beam is received by the polarizing beam splitter 42 and passes to the receiver 44 as a P-polarized optical receive beam. The transmit beam starting in the second transceiver 35 is analogous to the transmit beam in the first transceiver 27, but is polarized +45 degrees when looking along its direction of propagation. The beam passed to the receiver 44 by the polarizing beam splitter 42 would be S-polarized if the optical transmit beam from the transmitter 16 was P-polarized.

In another example of the transceiver system 200, no user adjustments are needed for agreed upon coordinates. In this example, the optical transmit beam is S-polarized (and could be P-polarized instead) and polarization rotators 22, 24 are Faraday rotators. Unlike the example above, the waveplates 24, 38 are quarter-wave plates. Starting with the first transceiver 27, the optical transmit beam is reflected off the mirror 18 and passes through the polarizing beam splitter 20. When the reflected optical transmit beam encounters the polarization rotator 22, its polarization is rotated from S-polarized to −45 degrees when looking along the transmit direction. The waveplate 24 modifies the rotated optical transmit beam to be right hand-circularly polarized by orienting the fast axis horizontally in the transceiver 27 (i.e., slow axis vertically). When the modulated beam output from the first transceiver 27 reaches the second transceiver 35 and is input to the waveplate 38, two things can occur: (1) if there is no relative rotation between the transceivers 27, 35, then the circularly polarized light will reach the waveplate 38 and will be converted to +45 degree polarization when viewed from the transmit direction. The polarization rotator 40 will rotate the polarization clockwise by +45 degrees to become horizontally polarized (i.e., P-polarized); and (2) if there is a relative rotation between the transceivers 27, 35, then the waveplate 38 will also be rotated and will convert the incoming right hand circularly polarized light to be linearly polarized at +45 degrees in the coordinate system of the second transceiver 35, as viewed along the transmit direction. The polarization rotator 40 will rotate the linear polarization clockwise by +45 degrees to become horizontally polarized in the coordinate system of the second transceiver 35. The same situation holds on transmission from the second transceiver 35 to the first transceiver 27—the transceivers can then be identical and function to automatically correct for any relative rotation between them.

Additional transceiver embodiments include an optical bandpass filter (OBP) that is optically coupled to an aperture 28, 34 and positioned between a receiver 30, 44 and a polarizing beam splitters 20, 42 of a transceiver 27, 35. The OBP filter is configured to filter obscuring light from the optical received beam. According to certain examples, the OBP filter is positioned between a polarizing beam splitter 20, 42 and a receiver 30, 44. In other examples, the OBP filter is positioned anywhere within the transceiver 27, 35 that is coupled to the communication channel 32 and positioned before detection of a received beam is carried out. In one example, the OBP is positioned before a quad cell in the transceiver 27, 35 to prevent the quad cell from locking on to a light source other than a target light source or being damaged. It is understood that multiple OBP filters may be positioned throughout the optical paths in the transceiver 27, 35 before detection.

Figure 3B:
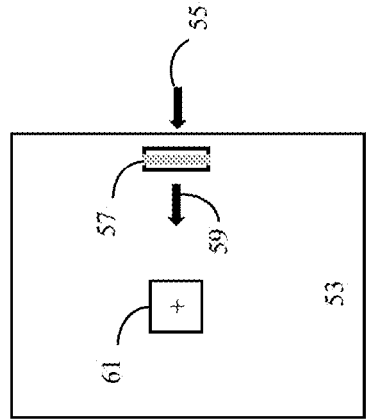
FIG. 3B is a block diagram of a receiver subsystem in a transceiver according to various examples described herein.
Figure 3A:
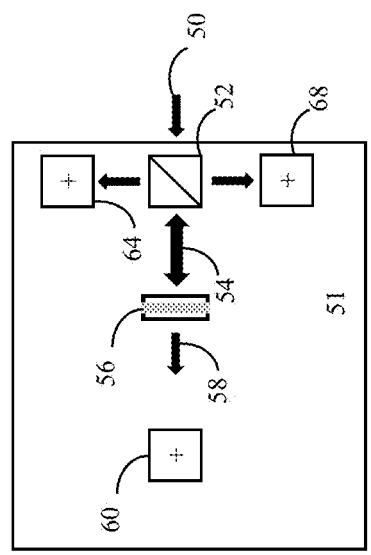
FIG. 3A is a block diagram of a receiver subsystem in a transceiver according to various examples described herein.

FIG. 3A illustrates a receiver subsystem 51 usable with any monostatic transceiver described herein. The receiver subsystem 51 includes a beam splitter 52, an optical resonator 56, a first detector 60, a second detector 64, and a third detector 68. In an example, the beam splitter is an 80/20 beam splitter. In another example, the optical resonator is an etalon. Other examples include beam splitters having any division of the incoming light (e.g., a 50/50 beam splitter). The receiver subsystem 51 is configured to receive a modulated and polarized optical receive beam 50 (e.g., the beam transmitted through the polarizing beam splitter 20 to the receiver 30). The beam splitter 52 is configured to reflect a percentage of the optical receive beam 50 towards the third detector 68 and transmit the remaining percentage of the optical receive beam 50 towards the optical resonator 56. In an example, the third detector 68 is a quad cell used to steer the optics 26. A bidirectional light path 54 indicates how the transmitted portion of the optical receive beam 50 travels to and interacts with the optical resonator 56. As energy is accumulated in the optical resonator 56, the optical resonator 56 reaches a steady state and some of the optical signal transmitted from the beam splitter 52 to the optical resonator 56 may be reflected off the optical resonator, and then reflected towards the second detector 64 via the beam splitter 52. The signal detected by the second detector 64, in some examples, provides data to a controller for tuning the optical resonator 56. As the transmitted portion of the optical receive beam interacts with the accumulated energy in the optical resonator 56, the optical resonator 56 produces an intensity modulated output optical signal 58, which is detected by the detector 60. In some examples, one or more of the signals detected by the detectors 60, 64, 68 is used to tune the optical resonator 56 to a specified resonant frequency.

FIG. 3B illustrates a receiver subsystem 53 usable with any monostatic transceiver described herein. The receiver subsystem 53 includes an optical resonator 57 and a detector 60. In an example, the beam splitter is an 80/20 beam splitter. In another example, the optical resonator 57 is an etalon. The receiver subsystem 53 is configured to receive a modulated and polarized optical receive beam 55 (e.g., the beam transmitted through the polarizing beam splitter 20 to the receiver 30). As energy is accumulated in the optical resonator 57, the optical resonator 57 reaches a steady state as the transmitted portion of the optical receive beam interacts with the accumulated energy in the optical resonator 56, the optical resonator 56 produces an intensity modulated output optical signal 59, which is detected by the detector 61. In some examples, the signal detected by the detector 61 used to tune the optical resonator 57 to a specified resonant frequency.

Figure 4:
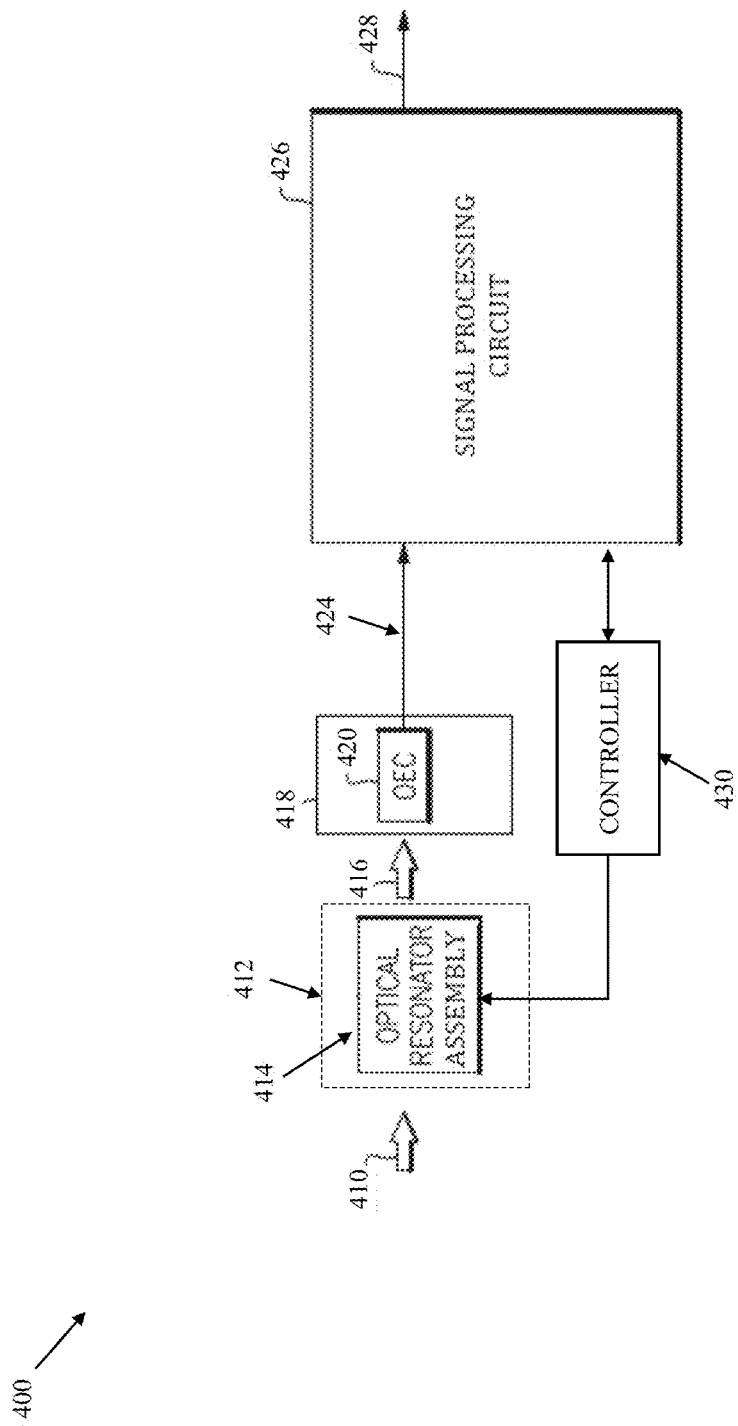
FIG. 4 is a functional block diagram an optical receiver according to various examples described herein.

FIG. 4 is a block diagram of one example of an optical receiver (e.g., similar to the receivers 30, 44) generally indicated at 400. The optical receiver 400 receives a modulated optical signal 410 transmitted along a free space signal path (e.g., free space optical, FSO), a fiber coupling, or another waveguide system from a transmitter (not shown). The optical receiver 400 includes a demodulator 412 that includes an optical resonator assembly 414. The optical receiver 400 further includes a detector assembly 418 including at least one optical-electrical converter (OEC) 420, and a signal processing circuit 426. In certain examples, the detector assembly 418 and the signal processing circuit 140 may be collectively referred to as a detector. The detector assembly 418 and the signal processing circuit 426 may be separate components or may be part of a common module. The optical resonator assembly 414 is positioned to receive the modulated optical signal 410 and to produce an output optical signal 416 that has characteristics representative of the modulation of the modulated optical signal 410, as discussed further below. The detector assembly 418 receives the output optical signal 416 from the optical resonator assembly 414 and the at least one OEC 420 converts the optical signal 416 into an electrical signal 424 that can be processed by the signal processing circuit 426 to produce a decoded information signal 428. The decoded information signal 428 may include the information that was encoded on the modulated optical signal 410 by the modulation of the modulated optical signal 410. The OEC 420 may include one or more photodiodes, for example, or other components capable of transforming an optical signal into an electrical signal. The signal processing circuit 426 may include various components, as will be understood by those skilled in the art, such as analog-to-digital converters, filters, amplifiers, controllers, etc., to condition and process the electrical signals received from the detector assembly 418 to produce the decoded information signal 428. The optical receiver 400 may further include a controller 430 that may be coupled to the optical resonator assembly 414 and configured to adjust parameters of the optical resonator assembly 414 to maintain a particular operating point of one or more optical resonators included in the optical resonator assembly 414, as discussed in more detail below.

In certain examples, the optical resonator assembly 414 includes one or more optical resonators, as described in embodiments herein, configured to convert the modulation of the modulated optical signal 410 into intensity modulation of the output optical signal 416. The modulated optical signal 410 may be phase modulated, amplitude modulated, and/or frequency modulated. As used herein, the term "optical resonator" refers to a component capable of sensing variations, such as frequency variations, amplitude variations, or phase variations in the received optical signal 410. Examples of optical resonators may include Fabry-Perot etalons or other types of optical resonators. Each optical resonator in the optical resonator assembly 414 converts the modulation of the arriving/input optical signal 410 in part by interaction of the arriving optical signal 410 with optical energy built-up in the resonator. Those skilled in the art will appreciate that other types of optical resonators can be operated according to similar principles. Further, the optical resonator may respond similarly to amplitude modulated or frequency modulated input optical signals.

Figure 5:
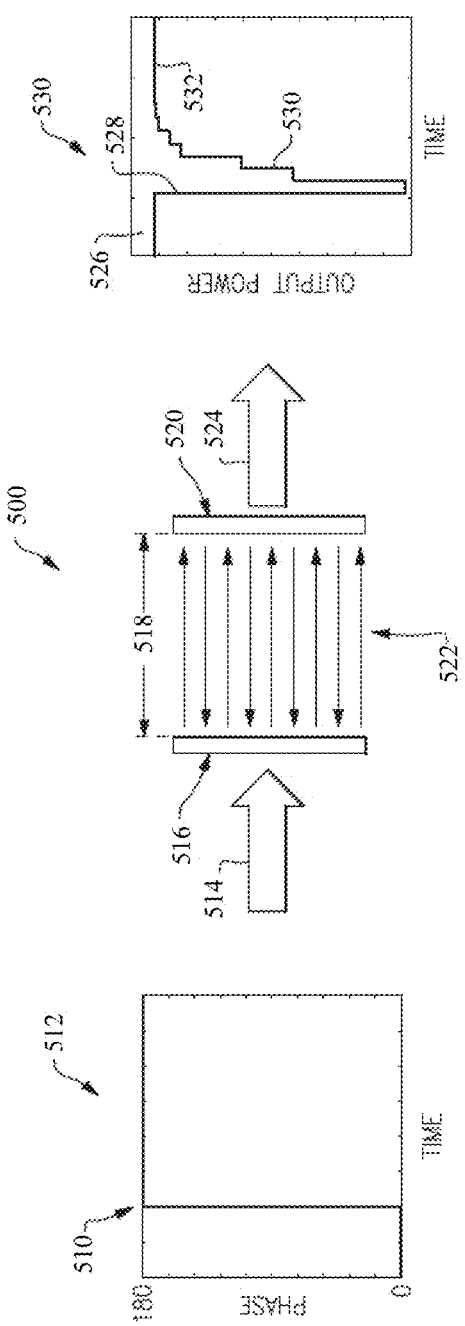
FIG. 5 is a schematic diagram of an optical resonator, including a graph of received signal phase and a graph of output intensity of the optical resonator according to various examples described herein.

Referring to FIG. 5, in certain examples an etalon 500 is a component having a pair of parallel semi-reflective surfaces 516, 520 that may include an optically transparent material in between, and has a characteristic resonant frequency associated with a certain wavelength of light based upon the spacing (i.e., dimension 518) between the semi-reflective surfaces. The surfaces 516,520 are semi-reflective and also semi-transmissive, in that they allow some light through, and therefore an arriving modulated optical signal 514 may be allowed into the etalon 500 and may resonate or accumulate inside the etalon (i.e., in an interior 522 between the two semi-reflective surfaces 516, 520). Additionally, some of the light resonating inside is allowed out of the etalon 500 (through at least one of the semi-transmissive surfaces). Light emerging from the etalon 500 is shown, for example, as an output optical signal 524.

The optical signal 514 received by the etalon 500 establishes a steady-state condition in which optical signal energy continuously arrives at the etalon 500, adds to the built-up, optically resonating, energy existing inside the etalon 500, and emerges from the etalon 500 at a constant rate. If the frequency, amplitude, or phase of the input optical signal 514 changes, this change causes a temporary disruption to the resonance inside the etalon 500 and the light intensity emerging from the etalon 500 is also disrupted, until a steady state condition is re-established. Accordingly, a change in phase, frequency, or amplitude of the arriving optical signal 514 causes a change in intensity of the output optical signal 524. Thus, the etalon functions as a demodulator, or a modulation converter, for the optical signal 524. The output optical signal 524 may therefore carry the same information content as the arriving optical signal 514, but in an intensity modulated form, rather than a phase modulated form, for example.

FIG. 5 illustrates an example of the above-described operation of the etalon 500. FIG. 5 shows a graph 512 of the input modulated optical signal 514, showing a phase change in the optical signal 514. The graph 512 plots the phase (vertical axis) of the optical signal 514 over time (horizontal axis), showing a phase transition of pi (180 degrees) at point 510. FIG. 5 also shows a graph 530 of optical signal intensity (as output power) emerging from the etalon 500 during the phase transition in the received optical signal 514. At region 526 the etalon 500 is in a steady-state resonance condition wherein a steady intensity of light emerges. At point 528, corresponding to point 510 in the graph 512, a phase transition occurs in the arriving optical signal 514, temporarily disrupting the steady-state and causing a drop in the emerging light intensity. During successive reflections inside the etalon 500, and indicated region 530 in the graph 530, resonance is re-establishing, and the emerging light intensity increases until, at point 238, a steady intensity of light emerges when the etalon 500 has returned to a steady-state condition. Thus, variations in the intensity of the output optical signal 524 from the etalon 500 indicate that a transition occurred in the arriving optical signal 514, such as a phase transition due to phase modulation of the optical signal 514.

The etalon 500 may have varying levels of reflectivity of the semi-reflective surfaces 516, 520. In certain examples, the reflectivity may be expressed as a fraction of light amplitude reflected back into the interior 522 or may be expressed as a fraction of light intensity reflected back into the interior 522. The reflectivity of each of the first and second semi-reflective surfaces 516, 520 may be the same or different, and may be any suitable value for a particular implementation. The etalon 500 is one example of a suitable optical resonator in accord with aspects and embodiments described herein. However, the use of the term "etalon" throughout this disclosure is not intended to be limiting and as used herein may include any of multiple structures, including plates with reflecting surfaces as well as parallel mirrors with various materials in between, and may also be referred to as cavities, interferometers, and the like. Additionally, etalon structures may be formed as a laminate, layer, film, coating, or the like. In some examples, an etalon may include reflective surfaces (including semi-reflective surfaces) that are not co-planar and/or are not co-linear. For example, an interior reflective surface of an etalon may include some curvature, and an opposing surface may also be curved such that a distance between the two surfaces is substantially constant across various regions of the etalon, in some examples. In other examples, an etalon may have non-linear or non-planar surfaces with varying distances between the surfaces at various regions, and may still function as an optical resonator for various wavelengths and at various regions, suitable for use in examples discussed herein. Accordingly, an etalon may be purposefully designed to conform to a surface, or to have various regions responsive to differing wavelengths, or responsive to differing angles of arrival for a given wavelength, in certain examples. In the example shown in FIG. 5, the output intensity/power from the etalon 500 exhibits a transient disturbance that is a temporary reduction in power; however, in other configurations the transient disturbance may instead be a temporary increase in response to a phase (or amplitude or frequency) transition occurring in the arriving modulated optical signal 514.

The optical resonator assembly 414 may include one or more etalons 500, or other types of optical resonators that operate similarly to convert the modulation of the input optical signal 410 into the intensity-modulated output optical signal 416 which may then be detected and processed to recover the information encoded in the original optical signal. In various examples, each optical resonator within the optical resonator assembly 414 may have one or more characteristic resonant frequencies (alternatively referred to as a characteristic resonant wavelength). When the frequency of the input optical signal 410 corresponds to the characteristic resonant frequency of the optical resonator, optical signal energy accumulates to build-up resonating optical signal energy inside that optical resonator, as discussed above, and the optical resonator is said to be operating in a resonant mode or condition. An optical resonator that is operating in a resonant mode may also be referred to as being "tuned" to the input optical signal 410. An optical resonator that is tuned to the frequency of the received optical signal 410 may output optical signal energy 416 of a higher intensity (e.g., amplitude) relative to one that is detuned. However, an optical resonator that is slightly detuned may provide a different response to a given modulation transition in the input optical signal 410 than an optical resonator that is tuned or one that is detuned by a different amount. Certain responses may be more desirable in some circumstances than other responses, and therefore it may be desirable to be able to tune the optical resonator to a particular resonance condition (i.e., on resonance or off-resonance/detuned by a certain amount).

Figure 6:
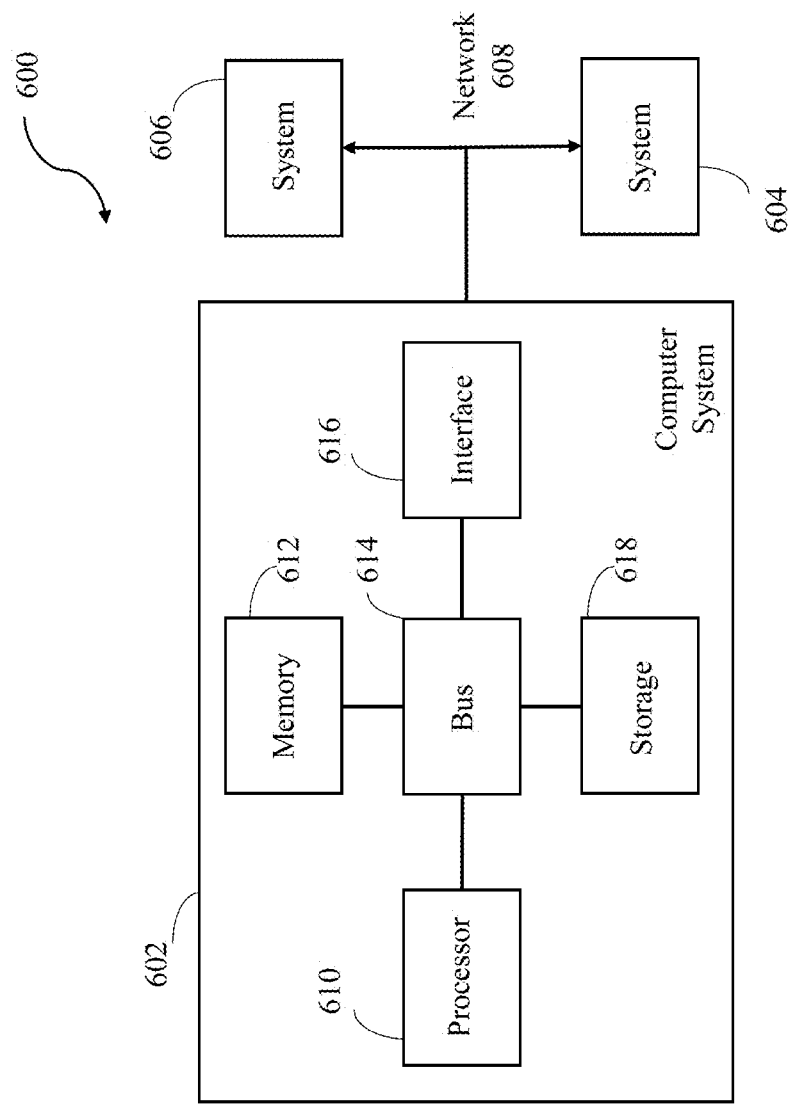
FIG. 6 is a functional block diagram of a computing system that may be configured to implement various examples of the processes described herein.

FIG. 6 is a block diagram of a distributed computer system 600, in which various aspects and functions discussed above may be practiced. The distributed computer system 600 may include one or more computer systems. For example, as illustrated, the distributed computer system 600 includes three computer systems 602, 604 and 606. As shown, the computer systems 602, 604 and 606 are interconnected by, and may exchange data through, a communication network 608. The network 608 may include any communication network through which computer systems may exchange data. To exchange data via the network 608, the computer systems 602, 604, and 606 and the network 608 may use various methods, protocols and standards including, among others, token ring, Ethernet, Wireless Ethernet, Bluetooth, radio signaling, infra-red signaling, TCP/IP, UDP, HTTP, FTP, SNMP, SMS, MMS, SS7, JSON, XML, REST, SOAP, CORBA HOP, RMI, DCOM and Web Services.

According to some embodiments, the functions and operations discussed for controlling a transceiver or tuning an optical resonator thereof can be executed on computer systems 602, 604 and 606 individually and/or in combination. For example, the computer systems 602, 604, and 606 support, for example, participation in a collaborative network. In one alternative, a single computer system (e.g., 602) can operate a transceiver. The computer systems 602, 604 and 606 may include personal computing devices such as cellular telephones, smart phones, tablets, "fablets," etc., and may also include desktop computers, laptop computers, etc.

Various aspects and functions in accord with embodiments discussed herein may be implemented as specialized hardware or software executing in one or more computer systems including the computer system 602 shown in FIG. 6. In one embodiment, computer system 602 is a personal computing device specially configured to execute the processes and/or operations discussed above. As depicted, the computer system 602 includes at least one processor 610 (e.g., a single core or a multi-core processor), a memory 612, a bus 614, input/output interfaces (e.g., 616) and storage 618. The processor 610, which may include one or more microprocessors or other types of controllers, can perform a series of instructions that manipulate data. As shown, the processor 610 is connected to other system components, including a memory 612, by an interconnection element (e.g., the bus 614).

The memory 612 and/or storage 618 may be used for storing programs and data during operation of the computer system 602. For example, the memory 612 may be a relatively high performance, volatile, random access memory such as a dynamic random access memory (DRAM) or static memory (SRAM). In addition, the memory 612 may include any device for storing data, such as a disk drive or other non-volatile storage device, such as flash memory, solid state, or phase-change memory (PCM). In further embodiments, the functions and operations discussed with respect to operating an optical transceiver can be embodied in an application that is executed on the computer system 602 from the memory 612 and/or the storage 618. For example, the application can be made available through an "app store" for download and/or purchase. Once installed or made available for execution, computer system 602 can be specially configured to execute operating an optical transceiver.

Computer system 602 also includes one or more interfaces 616 such as input devices, output devices and combination input/output devices. The interfaces 616 may receive input, provide output, or both. The storage 618 may include a computer-readable and computer-writeable nonvolatile storage medium in which instructions are stored that define a program to be executed by the processor. The storage system 618 also may include information that is recorded, on or in, the medium, and this information may be processed by the application. A medium that can be used with various embodiments may include, for example, optical disk, magnetic disk or flash memory, SSD, NVMe, among others. Further, aspects and embodiments are not to a particular memory system or storage system.

In some embodiments, the computer system 602 may include an operating system that manages at least a portion of the hardware components (e.g., input/output devices, touch screens, cameras, etc.) included in computer system 602. One or more processors or controllers, such as processor 610, may execute an operating system which may be, among others, a Windows-based operating system (e.g., Windows NT, ME, XP, Vista, 7, 8, 10, or RT) available from the Microsoft Corporation, an operating system available from Apple Computer (e.g., MAC OS, including System X), one of many Linux-based operating system distributions (for example, the Enterprise Linux operating system available from Red Hat Inc.), a Solaris operating system available from Sun Microsystems, or a UNIX operating systems available from various sources. Many other operating systems may be used, including operating systems designed for personal computing devices (e.g., iOS, Android, etc.) and embodiments are not limited to any particular operating system.

The processor and operating system together define a computing platform on which applications (e.g., "apps" available from an "app store") may be executed. Additionally, various functions for transmitting and receiving optical signals may be implemented in a non-programmed environment (for example, documents created in HTML, XML or other format that, when viewed in a window of a browser program, render aspects of a graphical-user interface or perform other functions). Further, various embodiments in accord with aspects of the present invention may be implemented as programmed or non-programmed components, or any combination thereof. Various embodiments may be implemented in part as MATLAB functions, scripts, and/or batch jobs. Thus, the invention is not limited to a specific programming language and any suitable programming language could also be used.

Although the computer system 602 is shown by way of example as one type of computer system upon which various functions for operating an optical transceiver may be practiced, aspects and embodiments are not limited to being implemented on the computer system, shown in FIG. 6. Various aspects and functions may be practiced on one or more computers or similar devices having different architectures or components than that shown in FIG. 6.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A monostatic optical transceiver comprising:
a single aperture:
a transmitter configured to provide a modulated and polarized optical transmit beam along a transmit direction in a coordinate system of the monostatic optical transceiver;
a receiver configured to receive a modulated and polarized optical receive beam along a receive direction in the coordinate system of the monostatic optical transceiver, the receiver being configured to receive the modulated and polarized optical receive beam at an optical resonator included therein, and process the received modulated and polarized optical receive beam to determine information from the received modulated and polarized optical receive beam;
a mirror configured to reflect the modulated and polarized optical transmit beam from the transmitter along the transmit direction to a polarizing beam splitter, wherein the polarizing beam splitter is configured to receive the modulated and polarized optical transmit beam from the mirror and reflect the optical transmit beam in the transmit direction, and to transmit the received modulated and polarized optical receive beam in the receive direction to the receiver;
a polarization rotator configured to rotate the polarization of the reflected optical transmit beam by a fixed number of degrees in the transmit direction; and
a waveplate configured to modify the polarization of the rotated optical transmit beam in the transmit direction to make the monostatic optical transceiver rotationally invariant while communicating through free space with respect to a second monostatic optical transceiver, the single aperture being optically coupled to the transmitter, the receiver, the mirror, the polarizing beam splitter, the polarization rotator, and the waveplate.

2. The monostatic optical transceiver of claim 1, wherein the optical resonator is a Fabry Perot etalon.

3. The monostatic optical transceiver of claim 1, wherein the polarization rotator is a Faraday rotator.

4. The monostatic optical transceiver of claim 1, wherein the receiver further comprises a beam splitter configured to provide the modulated and polarized optical receive beam to one or more of at least one detector and the optical resonator.

5. The monostatic optical transceiver of claim 1, wherein the monostatic optical transceiver further comprises a detector;
the waveplate is further configured to receive a modulated input beam and rotate a polarization of the received input beam;
the polarization rotator is further configured to receive the rotated input beam from the waveplate and further rotate the polarization of the rotated input beam;
the polarizing beam splitter is further configured to receive the further rotated input beam from the polarization rotator, the further rotated input beam being the modulated and polarized optical receive beam; and
the optical resonator is configured to receive and accumulate energy of the modulated and polarized optical receive beam, the detector being configured to produce an intensity-modulated output signal from the accumulated energy.

6. The monostatic optical transceiver of claim 5, further comprising an optical bandpass filter coupled between the optical resonator and the polarizing beam splitter, the optical bandpass filter configured to filter the modulated and polarized optical receive beam.

7. The monostatic optical transceiver of claim 1, wherein one of the optical transmit beam and the received optical receive beam is P-polarized and the other of the optical transmit beam and the received optical receive beam is S-polarized.

8. The monostatic optical transceiver of claim 1, wherein the waveplate is a half-wave plate configured to rotate the polarization-rotated optical transmit beam from the fixed number of degrees along the transmit direction to be perpendicular to a reference direction in a universal coordinate system shared by the second monostatic optical transceiver.

9. The monostatic optical transceiver system of claim 1, wherein the waveplate is a quarter-wave plate configured to convert the polarization-rotated optical transmit beam from the fixed number of degrees along the transmit direction to being right hand circularly polarized in the transmit direction.

10. A monostatic optical transceiver system including the monostatic optical transceiver of claim 1, the monostatic optical transceiver system comprising:
the second monostatic optical transceiver including:
a second single aperture; and
i) a half-wave plate configured to receive the modified rotated optical transmit beam from the waveplate of the monostatic optical transceiver through the second single aperture and alter the polarization of the modified rotated optical transmit beam; and
a second polarization rotator configured to rotate the polarization of the altered optical transmit beam in the coordinate system of the monostatic optical transceiver by the fixed number of degrees;
or
ii) a quarter-wave plate configured to receive the modified rotated optical transmit beam from the waveplate of the monostatic optical transceiver through the second single aperture, the modified rotated optical transmit beam being circularly polarized by the waveplate of the monostatic optical transceiver, and alter the circularly polarized beam to be linearly-polarized to the negative of the fixed number of degrees in the coordinate system of the monostatic optical transceiver; and
a second polarization rotator configured to rotate the polarization of the linearly-polarized beam clockwise by the negative number of degrees in the coordinate system of the monostatic optical transceiver.

11. The monostatic optical transceiver of claim 1, wherein the polarization rotator and the waveplate form a pair, the pair configured to rotate a polarization of an optical beam passing through the pair in the transmit direction and rotate a polarization of an optical beam passing through the pair in a receive direction.

12. The monostatic optical transceiver of claim 1, wherein the polarizing beam splitter is further configured to transmit the received modulated and polarized optical receive beam to the receiver.

13. A method of operating a monostatic optical transceiver, the method comprising:
providing the monostatic optical transceiver including a transmitter, a receiver, a mirror, a polarizing beam splitter, a polarization rotator, a waveplate, and a single aperture;
the transmitter providing a modulated and polarized optical transmit beam along a transmit direction in a coordinate system of the monostatic optical transceiver;
the receiver receiving a modulated and polarized optical receive beam from a receive direction in the coordinate system of the monostatic optical transceiver, the receiver receiving the modulated and polarized optical receive beam at an optical resonator included therein, and processing the received modulated and polarized optical receive beam to determine information from the received modulated and polarized optical receive beam;
the mirror receiving the modulated and polarized optical transmit beam and reflecting the modulated and polarized optical transmit beam along the transmit direction to the polarizing beam splitter;
the polarizing beam splitter reflecting, in the transmit direction, the modulated and polarized optical transmit beam from the mirror, and transmitting the received modulated and polarized optical receive beam to the receiver;
the polarization rotator rotating the polarization of the reflected optical transmit beam by a fixed number of degrees in the transmit direction; and
the waveplate modifying the polarization of the rotated optical transmit beam in the transmit direction to make the monostatic optical transceiver rotationally invariant while communicating through free space with respect to a second monostatic optical transceiver, the single aperture being optically coupled to the transmitter, the receiver, the mirror, the polarizing beam splitter, the polarization rotator, and the waveplate.

14. The method of claim 13, wherein the optical resonator is a Fabry Perot etalon that receives and accumulates energy of the modulated and polarized optical receive beam.

15. The method of claim 13, wherein the polarization rotator is a Faraday rotator and:
i) the reflected optical transmit beam is S-polarized;
the received optical receive beam is P-polarized; and
the Faraday rotator rotates the S-polarized beam by the fixed number of degrees along the transmit direction in the coordinate system of the monostatic optical transceiver and rotates a beam received from the waveplate to pass through the polarizing beam splitter as the P-polarized received optical receive beam;
or
ii) the reflected optical transmit beam is P-polarized;
the received optical receive beam is S-polarized; and
the Faraday rotator rotates the P-polarized beam by the fixed number of degrees along the transmit direction of the monostatic optical transceiver and rotates the beam received from the waveplate to pass through the polarizing beam splitter as the S-polarized received optical receive beam.

16. The method of claim 13, wherein providing the monostatic optical transceiver further comprises providing a beam splitter, the beam splitter providing the modulated and polarized optical receive beam to one or more of at least one detector and the optical resonator.

17. The method of claim 13, wherein providing the monostatic optical transceiver further comprises providing a detector;
the waveplate receiving a modulated input beam and rotating a polarization of the received input beam;

the polarization rotator receiving the rotated input beam from the waveplate and rotating the polarization of the rotated input beam;

the polarizing beam splitter receiving the further rotated input beam from the polarization rotator, the further rotated input beam being the modulated and polarized optical receive beam;

the optical resonator receiving and accumulate energy of the modulated and polarized optical receive beam; and the detector being configured to produce an intensity-modulated output signal from the accumulated energy.

18. The method of claim 17, wherein providing the monostatic optical transceiver further comprises providing an optical bandpass filter optically coupled between the optical resonator and the polarizing beam splitter, the optical bandpass filter configured to filter the modulated and polarized optical receive beam.

19. The method of claim 13, wherein one of the optical transmit beam and the received optical receive beam is P-polarized and the other of the optical transmit beam and the received optical receive beam is S-polarized.

20. The method of claim 19, wherein the waveplate is a half-wave plate that rotates the polarization-rotated optical transmit beam from the fixed number of degrees along the transmit direction to be perpendicular to a reference direction in a universal coordinate system shared by the second monostatic optical transceiver.

21. The method of claim 13, wherein the waveplate is a quarter-wave plate that converts the polarization-rotated optical transmit beam from the fixed number of degrees along the transmit direction to being right hand circularly polarized in the transmit direction.

22. A method of operating a monostatic optical transceiver system including the monostatic optical transceiver of claim 13, comprising the acts of:

providing the second monostatic optical transceiver including:

a second single aperture; and i) a half-wave plate receiving the modified rotated optical transmit beam from the waveplate of the monostatic optical transceiver through the second single aperture and altering the polarization of the modified rotated optical transmit beam; and a second polarization rotator rotating the polarization of the altered optical transmit beam in the coordinate system of the monostatic transceiver by the fixed number of degrees;

or ii) a quarter-wave plate receiving the modified rotated optical transmit beam from the waveplate of the monostatic optical transceiver through the second single aperture, the modified rotated optical transmit beam being circularly polarized by the waveplate of the monostatic optical transceiver, and altering the circularly polarized beam to be linearly-polarized to the negative of the fixed number of degrees in the coordinate system of the monostatic transceiver; and a second polarization rotator rotating the polarization of the linearly polarized beam clockwise by the negative number of degrees in the coordinate system of the monostatic transceiver.

23. The method of claim 13, wherein the polarization rotator and the waveplate form a pair, and the method further comprises:

the pair rotating a polarization of an optical beam passing through the pair in the transmit direction and rotating a polarization of an optical beam passing through the pair in a receive direction.

24. The method of claim 13, wherein the polarizing beam splitter transmits the received modulated and polarized optical receive beam to the receiver.

* * * * *